Feb. 28, 1961   J. B. WRIGHT   2,973,439
CURRENT-TRANSIENT DAMPER NETWORK
Filed July 25, 1958
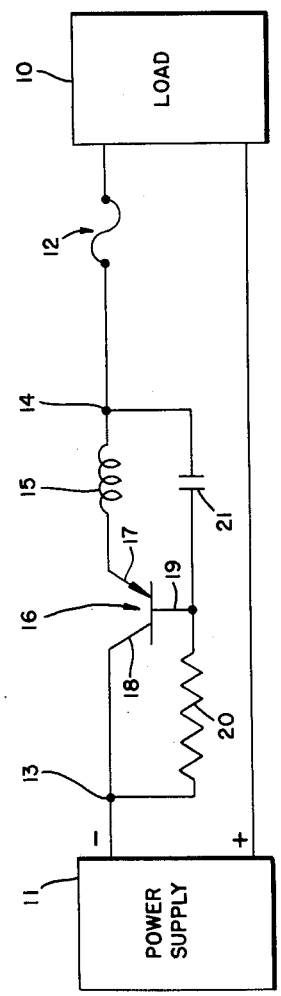
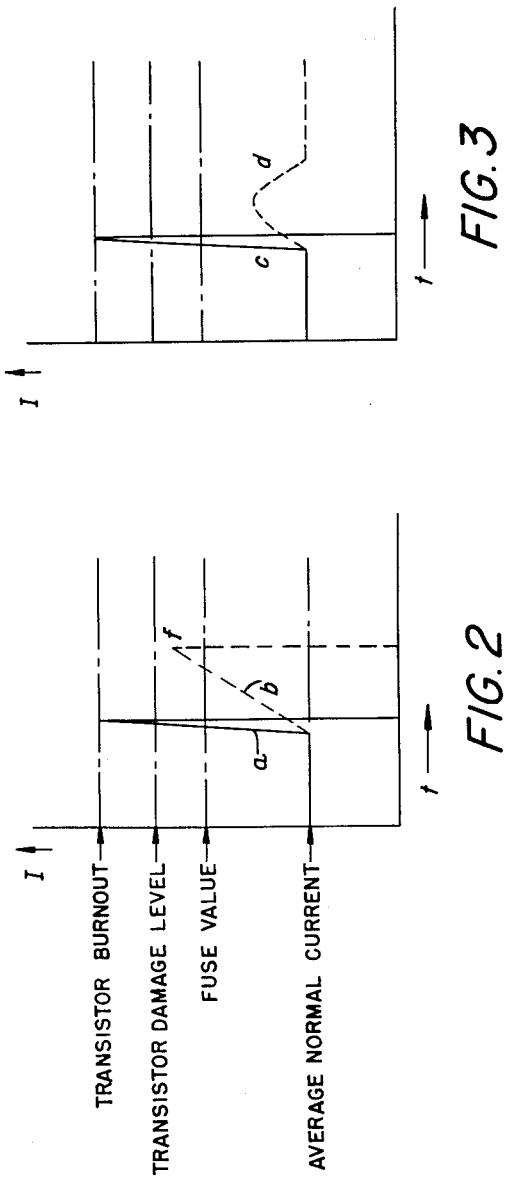
INVENTOR.
JAMES B. WRIGHT
BY *Evans & Pearne*
ATTORNEYS

United States Patent Office 2,973,439
Patented Feb. 28, 1961

2,973,439

CURRENT-TRANSIENT DAMPER NETWORK

James B. Wright, Warren, Pa., assignor to Cersolsun Research Corporation, Warren, Pa., a corporation of Delaware Filed July 25, 1958, Ser. No. 751,080

6 Claims. (Cl. 307—88.5)

This invention relates particularly to a current-transient damper network, and generally to means for preventing unnecessarily and undesirably rapid rates-of-change of currents in electrical or electronic circuits. An application of the invention is the protection of transistors in switching or other circuits against thermal runaway and consequent destruction.

The problem of thermal runaway in certain transistor applications has long been recognized. Thermal runaway may result when there occurs a trigger impulse caused by the collapse of a magnetic field or some transient occurrence, which causes collector current to exceed a critical value, thereby causing excessive heating, reduction in resistance, and further increase in collector current, the resulting unstable cycle causing destruction of the transistor within, for example, about 1 microsecond. Attempts to solve the problem by developing faster acting fuses have not been entirely successful for it has not to date been possible to provide fuses having response times of less than about 10 microseconds.

An object of the present invention is to provide a protective network which in effect complements a quick-acting fuse in such a manner as to allow the fuse to act before the protected transistor is destroyed by thermal runaway. The network contemplated by the invention includes a transistorized circuit arranged to apply to the protected circuit an impedance which is varied as a useful function of the rate-of-change of load current.

Another object of the invention is to apply the network to any circuit wherein extreme peak currents, caused by sudden effective short circuits, must be avoided.

These and other objects and advantages of the invention will become more fully apparent from the following description of an embodiment of the invention which is given by way of example.

In the accompanying drawings:

Figure 1 is a schematic diagram of the exemplifying embodiment of the invention; and Figures 2 and 3 are graphic illustrations to aid in the description of the invention.

Figure 1 shows a load 10 comprising a transistor application driven by a suitable power supply 11, suitable fusing means including the fuse 12 being provided to protect against excessive currents. The operation is such that normal load current is as shown in Figure 2 (prior to instant $t1$). Assuming now for the moment that elements 13—21 are excluded from the equipment so that protection is afforded solely by fusing means such as the fuse 12, then when a trigger impulse of voltage of sufficient amplitude and even brief duration causes the load impedance to drop, the current will rise towards a value determined by the power supply voltage and total circuit impedance and increase at a rate determined principally by the output capacitor of the power supply and the resistance of the load. This rate of current increase may cause currents in excess of the transistor rating to obtain well before the fuse can operate, thereby destroying the transistor.

Connected in series with the fuse 12 is the network having terminals 13 and 14 which are connected through an inductor 15 to the emitter and collector electrodes of a transistor 16, such as a junction-type transistor, which has an emitter 17, collector 18 and base 19. If the current requirements of the load are positive rather than negative, as the drawing indicates, the polarity of the terminals is reversed. Terminal 13 is connected to the base electrode of the transistor 16 through resistor 20 to impose a normal bias. Terminal 14 is connected to the base electrode of the transistor 16 through coupling capacitor 21. Under normal operation the transistor 16 is biased at or near its maximum current point and offers essentially no emitter-to-collector impedance to current flow. When a trigger impulse occurs, the load impedance is caused to drop sharply to nearly zero. Therefore, almost the full power supply voltage is caused to appear momentarily, through capacitor 21, across resistor 20. Thus, the bias on the base becomes less momentarily, and thereafter returns toward its original value, the rate of its return depending on the RC time-constant of the elements 20 and 21. At the same instant the collector current, flowing through the inductor, is cut off, but, as the base-bias returns towards normal, it then resumes and increases towards the new high-current level. This delayed increase in collector current is then a function of both the base circuit RC time-constant and the $LR_c$ (collector resistance) time-constant. The effect of the network is to protect the load against current transients of short duration by offsetting the decrease in load impedance by an increase in its own impedance, permitting the transient to pass without damage to the load, and, in many cases, without opening the fuse and disrupting the operation of the equipment.

A sudden, sustained, short circuit in the load, which would normally cause load transistor damage, is similarly prevented from doing damage. In this case, because there is a sustained increase of voltage applied to the fuse complementer network, the network will adjust itself to the new currents at a delayed rate. During this adjustment period, the load current through the inductor 15 and transistor 16 will increase toward its short-circut value but at a rate which is sufficiently reduced to permit the fuse means to operate and protect the load transistor.

The circumstance where a sudden, sustained short circuit occurs in the load is illustrated in Figure 2. Without the fuse complementer network, the current curve "$a$" would obtain. With the use of the network, the current curve "$b$" obtains. The fuse blowing point is indicated at "$f$," which is higher than the fuse value because of the time lag of the fuse.

The circumstance where a transient current impulse occurs is shown in Figure 3. The normal transient current impulse curve "$c$" obtains when the complementer network is not used. With the use of the network, the current curve "$d$" obtains.

It should be obvious that all the details of the exemplifying embodiment of the invention described above are not vital to the invention and various changes and modifications may be made without departing from the invention. The appended claims are intended to define the scope of the invention.

What is claimed is:

1. A transient-current damper network as complementer for fuse means used to protect a load which comprises a transistor application operating at a given frequency range, the fuse means being in series with the load, the complementer comprising a two-terminal network in series with the fuse means and the load, said network comprising a transistor having an emitter electrode, a base electrode and a collector electrode, a base-biasing resistor connected between the collector electrode and the base electrode, an inductor and a capacitor series-connected between the emitter electrode and the base electrode, the inductor being connected between the capacitor and the emitter electrode and the capacitor being connected between the inductor and the base electrode, a first terminal of the network being between the resistor and collector electrode, a second terminal of the network being between the inductor and capacitor.

2. A transient-current damper network as complementer for fuse means used to protect a load comprising a transistor application operating at a given frequency range, the fuse means being in series with the load, the complementer comprising a two-terminal network in series with the fuse means and the load, said network comprising a transistor having an emitter electrode, a base electrode and a collector electrode, the terminals of said network being connected in a path through said emitter electrode and said collector electrode, a resistor connected between said collector electrode and said base electrode and normally biasing said base electrode and means for temporarily developing a voltage in response to relatively abrupt decreases in load impedance and for applying such developed voltage to temporarily counteract normal base-bias.

3. A device as defined in claim 2, said last-named means comprising an inductor in said path and located beween the emitter electrode and its associated terminal, and a capacitor connected from the terminal-associated side of the inductor to the base electrode and also including said resistor.

4. A device as defined in claim 2, said last-named means comprising an inductor in said path and located between the emitter electrode and its associated terminal, and a capacitor connected from the terminal-associated side of said inductor to the base-electrode-associated side of said resistor and also including said resistor.

5. A transient-current damper network comprising a transistor having an emitter electrode, a base electrode and a collector electrode, a base-biasing resistor connected between the collector electrode and the base electrode, an inductor and a capacitor series-connected between the emitter electrode and the base electrode, the inductor being connected between the capacitor and the emitter electrode and the capacitor being connected between the inductor and the base electrode, a first terminal of the network being between the resistor and collector electrode a second terminal of the network being between the inductor and capacitor.

6. A transient-current damper network as complementer for fuse means used to protect a load comprising transistor applications operating at a given frequency range, the fuse means being in series with the load, the complementer comprising a two-terminal network having a very low internal impedance, and an integral circuit for changing said low impedance to higher impedance as a function of rate-of-change of current through said network.

References Cited in the file of this patent

UNITED STATES PATENTS

| | | |
|---|---|---|
| 2,585,078 | Barney | Feb. 12, 1952 |
| 2,801,346 | Rongen et al. | July 30, 1957 |
| 2,832,900 | Ford | Apr. 29, 1958 |
| 2,866,858 | Sziklai | Dec. 30, 1958 |
| 2,892,164 | Woll | June 23, 1959 |
| 2,906,926 | Bauer | Sept. 29, 1959 |
| 2,921,264 | Sundt | Jan. 12, 1960 |